United States Patent [19]

Sarasohn

[11] 4,048,948
[45] Sept. 20, 1977

[54] PRESSURE GAUGE

[75] Inventor: Neil L. Sarasohn, San Jose, Calif.

[73] Assignee: Gentran Inc., Sunnyvale, Calif.

[21] Appl. No.: 664,014

[22] Filed: Mar. 4, 1976

[51] Int. Cl.² .................. G01L 7/00; G01D 13/00
[52] U.S. Cl. ...................... 116/114 PV; 116/136.5
[58] Field of Search ............. 73/406, 407 R, 398 AR, 73/398 R, 410, 419; 116/114 PV, 114 H, 129 R, 136.5

[56] References Cited

U.S. PATENT DOCUMENTS

| 2,079,069 | 5/1937 | Johnson | 73/410 |
|---|---|---|---|
| 2,369,650 | 2/1945 | Allen | 73/410 |
| 3,032,732 | 5/1962 | Zuehlike et al. | 73/398 AR |
| 3,089,109 | 5/1963 | Zuehlike et al. | 73/398 AR |

Primary Examiner—Donald O. Woodiel
Attorney, Agent, or Firm—Flehr, Hohbach, Test, Albritton & Herbert

[57] ABSTRACT

A pressure gauge employing mechanical leverage to amplify movement of a push rod, together with a preformed laminated spring which further amplifies the mechanical motion by means of differential movement of the outer laminates thereof so as to swing one end of the spring about a wide arc.

12 Claims, 3 Drawing Figures

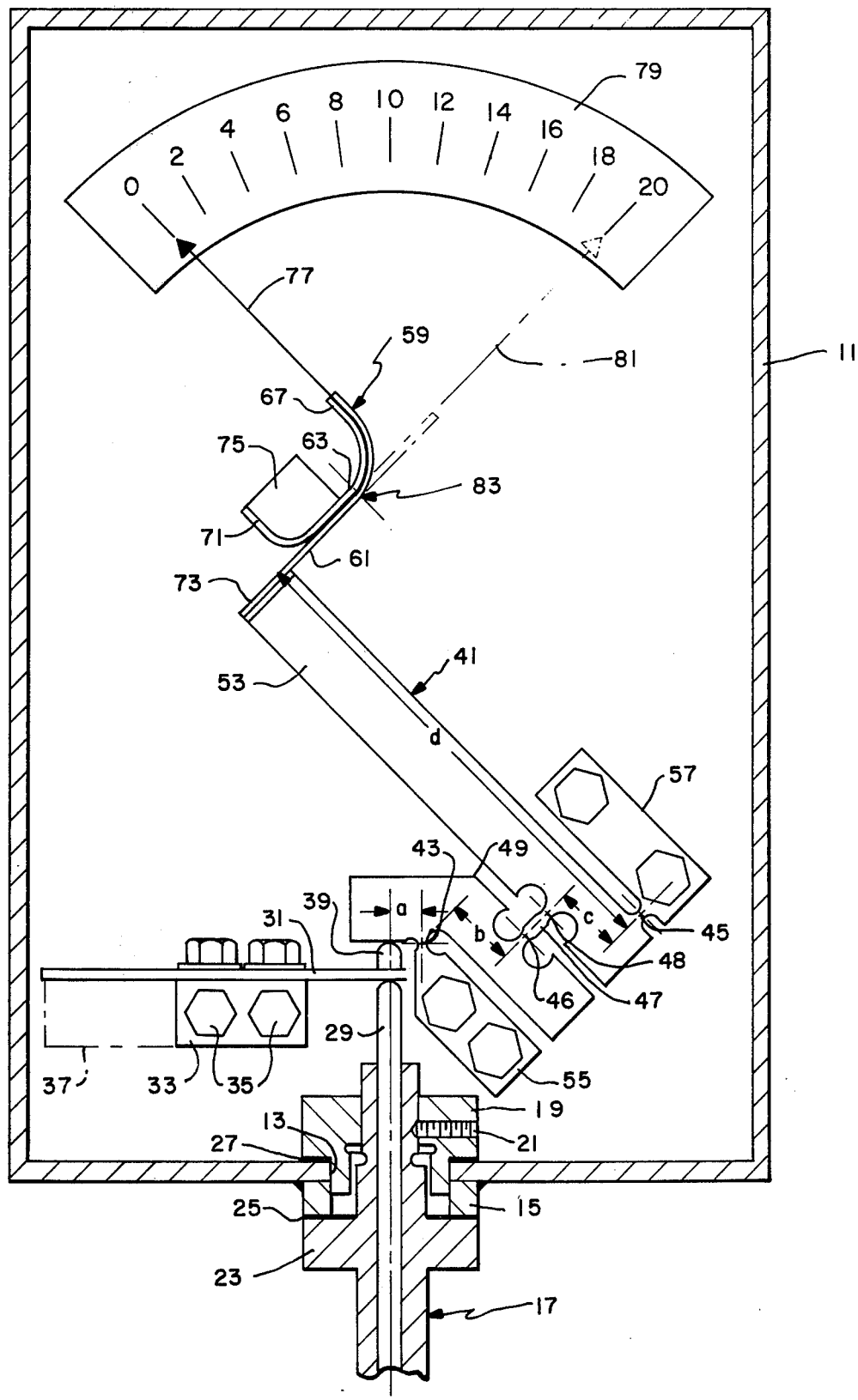
FIG.—1

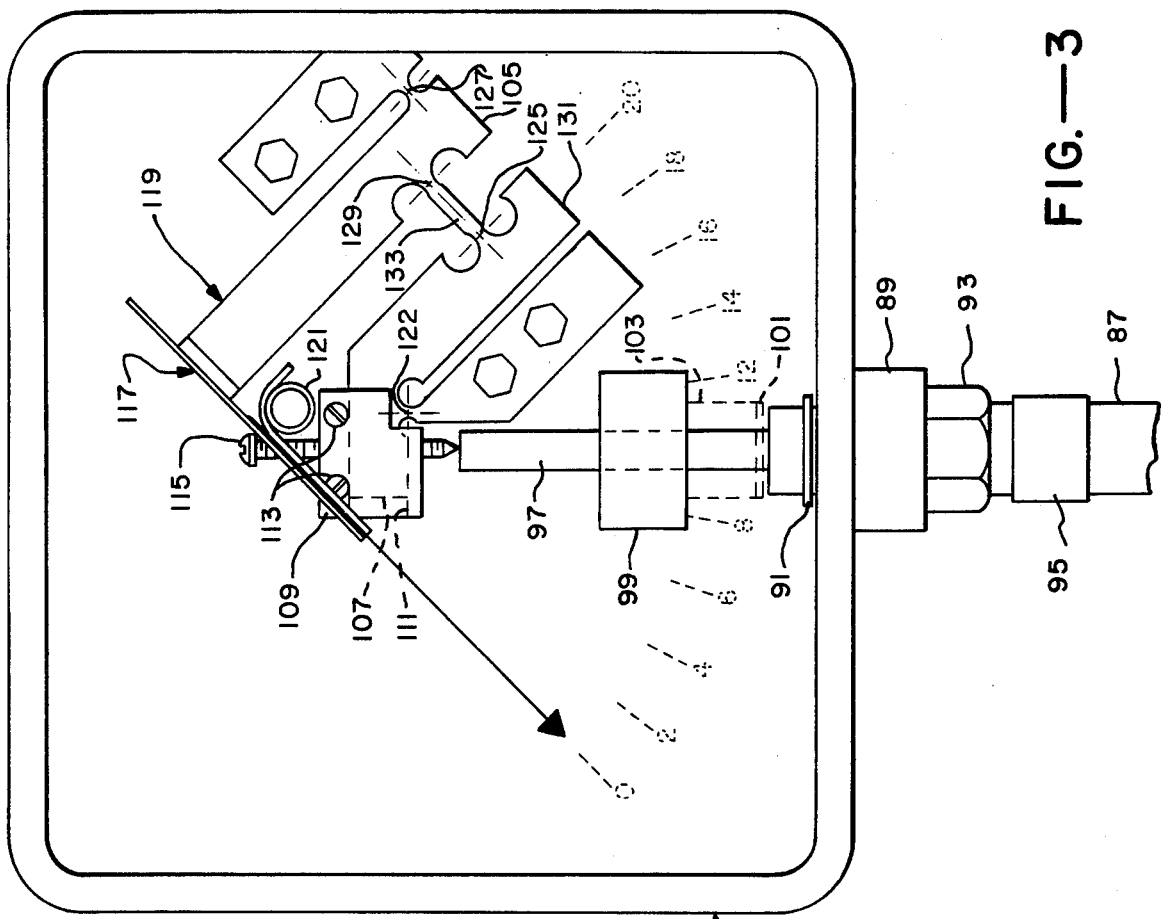
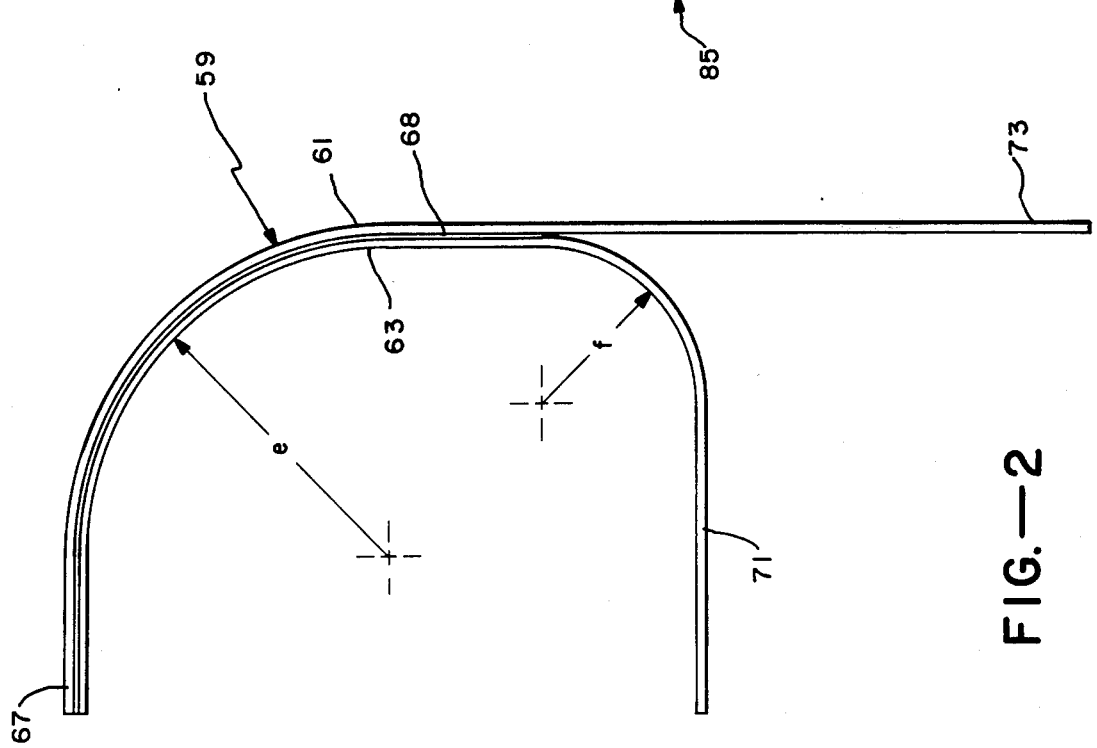

PRESSURE GAUGE

BACKGROUND OF THE INVENTION

The most common construction of a pressure gauge utilizes a Bourdon tube as the pressure transfer mechanism for a pressure sensor. In measurement of high pressure, that is, in ranges over 1,000 pounds per square inch, the use of Bourdon gauges seems to be the exclusive means of constructing pressure gauges.

A Bourdon gauge has one feature that limits its use for certain applications. It depends upon the pressure media entering the Bourdon tube as a means of generating a deflection to indicate pressure. Some industries require extremely clean pressure instruments and contamination of the pressure media is detrimental to the fluid being measured. In the plastic industry, the hot plastic melt must be prevented from entering a pressure gauge since, upon cooling, the plastic solidifies and in turn renders the gauge useless.

SUMMARY OF THE INVENTION AND OBJECTS

The present invention is a novel approach to measure pressure as sensed by a relatively stiff metal diaphragm that deflects in response to a given pressure in the order of thousands of an inch, and mechanically amplifies the movement so as to give rise to an indicator with a full scale deflection of approximately 5½ inches.

The pressure gauge comprises a push rod coupled at one end to a diaphragm or other source of pressure and, at its other end, to a lever system for amplifying the movement of the rod. At the opposite end of the lever system is a preformed laminated spring including two outer laminates of relatively nonextensive material such as spring steel and a central laminate of friction reducing material such as polytetrafluoroethylene (Teflon). One end of all three of the laminates are secured together and the opposite end of one of the outer laminates is secured in a relatively fixed position. The opposite end of the other outer laminate is connected to the end of the lever system.

It is a general object of this invention to provide an improved mechanically operated pressure gauge which totally isolates the pressure medium from the internal mechanism of the gauge.

BRIEF DESCRIPTION OF THE DRAWING

FIG. 1 is a plan view of a pressure gauge in accordance with one embodiment of the invention;

FIG. 2 is a plan view of laminated spring used in accordance with the present invention; and FIG. 3 is a plan view of an alternative embodiment of the invention.

DETAILED DESCRIPTION OF THE PREFERRED EMBODIMENT

Referring to FIG. 1 there is shown a case 11 having an opening 13 at one end thereof with an annular flange 15 thereabout. A body 17 is held in the opening 13 by means of a retaining collar 19 and set screw 21, together with an enlarged shoulder 23 on the body 17. A low friction washer 25 is disposed between the flange 15 and the shoulder 23. A similar low friction washer 27 is disposed between the retaining collar 19 and the surface of the case 11. Thus, it is seen that even though the body 17 is held in the opening 13, the case 11 is free to rotate about the body 17. The shoulder 23 is hexagonally shaped to provide a wrench surface whereby the opposite end of the body 17 may be screwed into an orifice where pressure is to be measured.

Slidably extending through the body 17 is a push rod 29 which, as well understood by those skilled in the art, acts in cooperation with a spring 31 and an isolating diaphragm (not shown) at its opposite end to measure pressure by means of its upward movement as shown in FIG. 1.

Spring 31 is secured in an adjustment block 33 which is itself secured to the case 11 by means of bolts 35. The extension of the spring 31 to the right of the adjustment block, as shown in FIG. 1, may be adjusted be repositioning the adjustment block such as to the position shown in dashed lines 37. In this manner the restraining force applied by the spring 31 to the push rod 29 may be varied.

The portion of the spring 31 immediately above the push rod 29 carries a boss 39. The boss 39 is in direct contact with a lever system 41 which may be conveniently stamped from relatively thin gauge spring steel.

The lever system 41 includes two fulcrum points 43 and 45, a link portion 47 connected between connection points 46 and 48, levers 49 and 53, together with base mounting members 55 and 57. The base mounting members 55 and 57 are secured to the case 11 by means of bolts. The distance between the contact of the boss 39 with the lever 49 to the fulcrum 43 is a first lever arm $a$. Second lever arm $b$ is set by the distance between the fulcrum 43 and the link 47. A third lever arm $c$ is the distance between the link 47 and the fulcrum 45 while the final lever arm $d$ is the distance between the fulcrum 45 and the end of the lever 53.

It is seen then that the movement at the upper end of the lever 53, as shown in FIG. 1, is a multiplication of the upward movement of the push rod 29 by the amount:

$$(b/a) \times (d/c)$$

In a practical embodiment of the invention, as actually constructed by applicant the lever arms $a$, $b$, $c$ and $d$ have been set at 0.25 inches, 0.50 inches, 0.50 inches and 3.81 inches, respectively. Thus, it is seen that the multiplication of movement between the push rod 29 and the outer end of the lever 53 is:

$$\frac{0.5}{0.25} \times \frac{3.81}{.5} = 15.2$$

While the mechanical multiplication of 15.2 is in itself rather extensive, it should be recognized that the actual movement of a push rod might be limited to about 0.001 to 0.002 inches. Consequently, the multiplication factor 15.2 is clearly not sufficient.

In order to further amplify the movement, the outer end of the lever 53 is secured to a laminated spring 59, shown more fully in FIG. 2.

Referring specifically to FIG. 2, the laminated spring 59 includes an outer tape 61 and an inner tape 63, both of which may be formed of spring steel. A central tape 65 is held between the tapes 61 and 63 and the outer two tapes are bonded together at their outer end 67 such as by welding. The tapes 61 and 63 are preformed to have a radius $e$ near their outer end 67. The inner tape 63 may also conform to a radius $f$ so as to separate its end 71 from the end 73 of the tape 61 and thereby permit the two ends 71 and 73 to be affixed to their associated elements, as will be described hereinafter.

Referring again to FIG. 1, there is shown a base port 75 which is secured to the case 11. The end 71 of the inner tape 63 is secured to the post 75 such as by a screw. The end 73 of the outer tape 61 is secured to the outer end of the lever 53, likewise by means of a screw. The outer end 67 of the laminated tape has secured to it a pointer 77 which cooperates with a dial 79 on the case 11.

As the outer end of the lever 53 moves counterclockwise, as shown in FIG. 1, the outer tape 61 is moved while the inner tape 63 is restrained by the post 75. Thus, the end 67 of the laminated tape and the pointer 77 carried by it, are swung around to the position shown in dashed lines 81 at full scale. Thus it can be seen that even further amplification of the mechanical movement of the push rod 29 is accomplished. Again, in a practical example, as actually constructed by applicant, the tapes 61 and 63 are formed of spring steel having a thickness of 0.015 inch with a Teflon tape 65 therebetween having a thickness of 0.005 inches. The radius e in the particular example actually constructed, was 0.500 inches.

With these dimensions the length of the inner tape about the quarter circle arc described by the radius e is 0.786 inches while that of the outer tape 71 is 0.816 inches for a difference of 0.030 inches in the length of the two tapes when in the position as shown in FIG. 2. When, however, the tapes are pulled by the lever 53 to the full scale position shown by dashed lines 81 in FIG. 1, the lengths of the two tapes 61 and 63, corresponding to that which was the arc formed by the radius e, are equal. Consequently, 0.030 inches counterclockwise movement of the outer end of the arm 53 causes a full scale deflection of the needle 77.

In the example actually constructed by applicant, the needle 77 has a length of 1.812 inches which, when added to the arcuate section of the tape 59 about the radius e provides an approximate radius of 2.598 inches about the point 83 shown in FIG. 1. Such a radius produces a 90° arc from zero to full scale as shown in FIG. 1, of about 4 inches. With this in mind the additional amplification of movement provided by the spring 59 and pointer 77 is 4 divided by 0.03 or 133. This amplification in addition to the 15.2 multiplication provided by the lever system 41 provides an overall amplification in the neighborhood of 200. Consequently, a vertical movement of the push rod 29 of only 0.001 inch produces a movement at the outer end of the pointer 77 of 2 full inches which clearly is adequate.

Referring now to FIG. 3 a further embodiment of the invention is shown which is similar to that shown in FIG. 1 but with the laminated spring extended in its straightened position for zero scale and permitted to relax while moving to its full scale position. As can be seen from FIG. 3 a substantially smaller case 85 may be employed with the body 87 extending through a flange 89 in an opening in the side of the case. A retaining ring 91, together with a nut 93 threadably secured to the body 87 serves to retain the body in position on the case but still allows for rotation of the case about the body. The body includes a raised and flattened portion 95 which may serve as a wrench hold for threading it into and orifice.

Push rod 97 extends through the body and also through a raised boss 99 which is secured to or forms a part of the case 85. A retaining ring 101 is secured to the push rod 97 and a number of spring washers 103 are disposed on the push rod 97 between the boss 99 and retaining ring 101. The spring washers 103 may be used in conjunction with normal flat washers in varying number and position so as to provide varying preselected degrees of resistance to pressure applied through the push rod 97.

A lever system 105, similar to the system 41 of FIG. 1 is secured to the case 85 such as by bolts. One lever 107 of the system 105 carries an adjustment block 109. The adjustment block includes a slot 111 into which the lever 107 fits and the lever is clamped between the front and back of the block 109 by means of clamping screws 113. The block 109 carries an adjusting screw 115 which extends through the block 109 and contacts the end of the push rod 97 so as to provide a zero adjust for the gauge.

A laminated spring 117, identical to the spring 59 of FIG. 1, is secured to the end of the lever 119 of the system 105. The spring 117 is also secured to a post 121. The manner of securing the spring 117 to the lever 119 and post 121 is the same as with respect to comparable parts shown in FIG. 1.

Referring to FIG. 3, it is seen that the operation is similar to that of the device shown in FIG. 1. However, the upward excursion of the push rod 97 permits the tape 117 to return to its relaxed position, as shown in FIG. 2. Thus, in the embodiment of FIG. 3 the tape is in its stretched position for zero scale and fully relaxed at full scale.

A substantial difference between the embodiment shown in FIGS. 1 and 3 is the relationship between the various fulcrum points and connection points in the lever systems. In the embodiment of FIG. 1 a imaginary line between the first fulcrum point 43 and its most adjacent connection point 46 lies substantially parallel to an imaginary line drawn between the second fulcrum point 45 and its most adjacent connection point 48. With such an arrangement it is clear that upon clockwise rotation of the lever 49 and the consequent counterclockwise rotation of the lever 53 the movement of both connection points 46 and 48 is substantially vertical (keeping in mind that the actual movement of the connection points 46 and 48 is but a few thousandths of an inch of the total arc about the fulcrum points 43 and 45) whereby the link 47 is not subjected to any severe tension.

Referring to FIG. 3, however, an imaginary line drawn between the first fulcrum point 123 and its most adjacent connection point 125 is clearly oblique to an imaginary line drawn between the second fulcrum point 127 and its most adjacent connection point 129. Thus, upon clockwise rotation of the lever 131 the connection point 25 moves downward and to the left as seen in FIG. 3 while the consequent counterclockwise rotation of the lever 119 causes the connection point 129 to move downward and to the right, as shown in FIG. 3. The link 133 then is subjected to substantial tension by the leftward moving connecting point 125 and the rightward moving connecting point 129. This tension, of course, will cause some extension of the link 135 and will require more force to activate the lever system 105 of FIG. 3 than is required to activate the lever system 145 of FIG. 1.

What is claimed is:

1. A pressure gauge comprising a cause, a push rod carried by said case and adapted to be coupled at one end to a source of pressure to be measured, lever means having one end coupled to the other end of said push rod, and spring means coupled to the other end of said lever means, said spring means including first, second and third tapes secured together at one end, the other end of said first tape being secured to said lever means, the other end of said second tape being secured to said case, the third tape being disposed between said first and second tapes and being formed of a material having a low coefficient of friction with respect to said first and second tapes whereby differential movement between said first and second tapes is facilitated, and indicator means disposed at said one end of the first, second and third tapes.

2. A pressure gauge as defined in claim 1, wherein said spring means is preformed to include an arcuate section in its relaxed condition.

3. A pressure gauge as defined in claim 1, wherein said first and second tapes are formed of spring steel and said third tape is formed of polytetrafluoroethylene.

4. A pressure gauge comprising a case, a push rod carried by said case and adapted to be coupled at one end to a source of pressure to be measured, lever means having one end coupled to the other end of said push rod, said lever means comprising a unitary structure including a plurality of levers, said unitary structure including reduced cross sectional areas defining pivot points for said levers, spring means coupled to the other end of said lever means, said spring means including first and second tapes secured together at one end, the other end of said first tape being secured to said lever means, the other end of said second tape being secured to said case, and indicator means disposed at said one end of the first and second tapes.

5. A pressure gauge comprising a case, a push rod carried by said case and adapted to be coupled at one end to a source of pressure to be measured, lever means having one end coupled to the other end of said push rod, said lever means comprising a stamped sheet of metal defining a plurality of lever portions and base portions each having relatively large cross sectional areas, and fulcrum portions having relatively small cross sectional areas defining interconnections between said base portions and said lever portions, and spring means coupled to the other end of said lever means, said spring means including first and second tapes secured together at one end, the other end of said first tape being secured to said lever means, and the other end of said second tape being secured to said case, and indicator means disposed at said one end of the first and second tapes.

6. A pressure gauge as defined in claim 5, wherein said lever means further includes a link portion having at each end thereof a relatively small cross sectional area defining connection points between the link and said lever portions.

7. A pressure gauge comprising a case, a push rod carried by said case and adapted to be coupled at one end to a source of pressure to be measured, lever means having one end coupled to the other end of said push rod, said lever means comprising a unitary structure including first and second levers, first and second bases and a link, a first fulcrum portion having a relatively small cross sectional area defining an interconnection between said first lever and said first base, a second fulcrum portion having a relatively small cross sectional area defining an interconnection between said second lever and said second base, a first connection portion having a relatively small cross sectional area defining an interconnection between said first lever and one end of said link and a second connection portion having a relatively small sectional area defining an interconnection between said second lever and the other end of said link, and spring means coupled to the other end of said lever means, said spring means including first and second tapes secured together at one end, the other end of said first tape being secured to said lever means, and the other end of said second tape being secured to said case, and indicator means disposed at said one end of the first and second tapes.

8. A pressure gauge as defined in claim 7 wherein said first fulcrum portion and said first connection portion define an imaginary line substantially parallel to an imaginary line defined by said second fulcrum portion and said second connection portion 9. In a gauge, a movaeble element whose movement is to be measured, a laminated spring for amplifying mechanical motion, said spring comprising first, second and third tapes secured together at one end, the third tape being intermediate the first and second tapes and being formed of material having a low coefficient of friction with respect to said first and second tapes whereby differential movement between said first and second tapes is facilitated, the other end of said first tape being secured in a fixed position, the other end of said second tape being coupled to said moveable element, and indicator means disposed to said one end of the first and second tapes.

10. In a pressure gauge as defined in claim 9 wherein said first and second tapes are formed of spring steel and said third tape is formed of polytetrafluoroethylene.

11. In a gauge, a case, a moveable element whose movement relative to said case is to be measured, a lever system for amplifying said movement, said lever system comprising a unitary structure including first and second levers, first and second bases and a link, said first and second bases being secured to said case, a first fulcrum portion having a relatively small cross sectional area defining an interconnection between said first lever and said first base, a second fulcrum portion having a relatively small cross sectional area defining an interconnection between said second lever and said second base, a first connection portion having a relatively small cross sectional area defining an interconnection between said first lever and one end of said link and a second connection portion having a relatively small cross sectional area defining an inteconnection between said second lever and the other end of said link, means for coupling said moveable element to said first lever and indicator means coupled to said second lever.

12. In a gauge as defined in claim 11 wherein said first fulcrum portion and said first connection portion define an imaginary line substantially parallel to an imaginary line defined by said second fulcrum portion and said second connection portion.

* * * * *